United States Patent [19]

Sahm, III

[11] 4,267,433
[45] May 12, 1981

[54] ELECTRICALLY HEATABLE WINDSHIELD HEATER CONTROL CIRCUIT

[75] Inventor: William H. Sahm, III, Syracuse, N.Y.

[73] Assignee: General Electric Company, Schenectady, N.Y.

[21] Appl. No.: 83,177

[22] Filed: Oct. 9, 1979

[51] Int. Cl.³ .............................. B60L 1/02; H02J 7/14
[52] U.S. Cl. .................................. 219/491; 219/497; 219/519; 219/203; 322/8; 322/24
[58] Field of Search ............... 219/490, 279, 202, 203, 219/491, 514, 519; 322/8, 28, 24, 73, 74, 97, 98

[56] References Cited

U.S. PATENT DOCUMENTS

| | | | |
|---|---|---|---|
| 3,300,619 | 1/1967 | Nilssen | 219/202 |
| 3,469,073 | 9/1969 | Zechin | 219/279 |
| 3,571,560 | 3/1971 | Nilssen et al. | 219/279 |
| 3,752,348 | 8/1973 | Dickason et al. | 219/202 |
| 3,944,893 | 3/1976 | Hayden | 219/203 |
| 4,084,126 | 4/1978 | Clements | 322/8 |
| 4,100,474 | 7/1978 | Pfeffer et al. | 322/28 |
| 4,117,390 | 9/1978 | Iwata et al. | 219/202 |
| 4,141,613 | 2/1979 | Mori et al. | 322/28 |
| 4,143,313 | 3/1979 | Arendt | 322/28 |
| 4,188,527 | 2/1980 | Follmer | 219/202 |

Primary Examiner—Elliot Goldberg
Assistant Examiner—M. Paschall
Attorney, Agent, or Firm—Marvin Snyder; James C. Davis

[57] ABSTRACT

A control circuit for supplying power to the heater of an electrically heatable windshield of an automotive vehicle while simultaneously providing the requisite current for the standard electrical system of the vehicle includes a resistive heating element connected in series between the vehicle alternator output and the high voltage terminal of the vehicle battery, so that current conducted through the heating element is supplied to both the battery and the load circuit. A control circuit, responsive to the alternator output voltage and the battery voltage, controls a voltage regulator to regulate the alternator output voltage within a first narrow band corresponding to the rated battery voltage and within a second narrow band corresponding to a given power rating for the heater.

16 Claims, 2 Drawing Figures

ELECTRICALLY HEATABLE WINDSHIELD HEATER CONTROL CIRCUIT

BACKGROUND OF THE INVENTION

The invention relates generally to the electrical system of an automotive vehicle and, more particularly, to control circuitry for controlling the supply of power to an electrically heatable windshield of a quantity that provides deicing of said windshield.

Numerous electrical systems have been developed for deicing automotive windshields and backlites of the type which employ heating elements such as thin film metalization or a pattern of resistive heating wires embedded in the window material, which exhibit good optical transparency. A principal requirement of these systems is to supply power to the heating wires that, within safe limits of the window material, can provide a relatively rapid deicing of the window to temperatures well below freezing. This has been found to require the generation of voltages substantially higher than the usual regulated battery voltage. A second important requirement is to supply such heating power without adversely affecting the vehicle's battery charge requirements and electrical operation. A number of systems have employed high voltage auxiliary alternators for this purpose, which operate substantially independent of the existing automotive electrical system. While these systems can be designed to directly meet the requirements of good deicing performance, they are not a viable solution for the mass automotive market because of space and weight restrictions and the relatively high cost of such added alternator equipment.

In other type systems the standard vehicle alternator is employed to supply power to the resistive heating elements. In such cases the existing automotive circuit must be modified to generate the relatively high power required for the deicing function, and also, as possible, maintain the requisite charge on the vehicle battery and fulfill the normal automotive load requirements. In one exemplary system of this type the alternator is for a short period disconnected from the standard automotive circuit including the battery, load and voltage regulator and is connected to the resistive heating elements for the purpose of deicing. During this period an unregulated alternator can supply voltages substantially higher than the regulated battery voltage, while the battery supplies the normal automotive load. At the end of the period, the length of which may be determined by a temperature sensor, the alternator is reconnected to the regulator and standard load circuit. While these systems may achieve a reasonably good deicing performance, they have limitations in respect to maintaining at all times the best balance of energy requirements for the battery and load circuitry, and also of generating the safe as well as high voltages necessary for deicing.

SUMMARY OF THE INVENTION

It is accordingly an object of the invention to provide a novel and improved heater control circuit for automotive vehicle windshields that employs the vehicle alternator to supply the requisite voltage for deicing purposes while continuously maintaining the energy requirements of standard automotive electrical circuitry.

It is a further object of the invention to provide a novel and improved heater control circuit as above described which ensures that the vehicle alternator when supplying voltages for deicing is controlled to operate within safe limits.

A further object of the invention is to provide a novel and improved heater control circuit as above described which seeks to optimize the distribution of power supplied by the alternator between the resistive heating elements and standard electrical load of the vehicle.

Another object of the invention is to provide a novel and improved heater control circuit as above described which requires minimum modification of the standard automotive electrical system and is inexpensive to manufacture.

These and other objects are accomplished in accordance with one aspect of the invention by a heater control circuit comprising resistive heating means coupled between the output terminal of the vehicle alternator and the high voltage terminal of the vehicle battery. First control means responsive to the battery voltage at said high voltage terminal supplies a first control signal to voltage regulator means for regulating the alternator output voltage within a first narrow band which when translated through said resistive heating means corresponds to a given voltage rating for said battery. Second control means responsive to said alternator voltage supplies a second control signal to said voltage regulator means for regulating said alternator voltage within a second narrow band which corresponds to a given power rating for said resistive heating means, whereby with said series resistive heating means connected in the circuit said heating means and said battery can be simultaneously energized under the control of a dual voltage regulation.

In accordance with a further aspect of the invention additional heating elements are selectively coupled into the circuit, including a shunt heating element coupled in shunt with the battery, for providing added heating functions and for assisting in said dual voltage regulation.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figures of the drawings, in which:

DETAILED DESCRIPTION OF THE PREFERRED EMBODIMENTS

Figure 1:
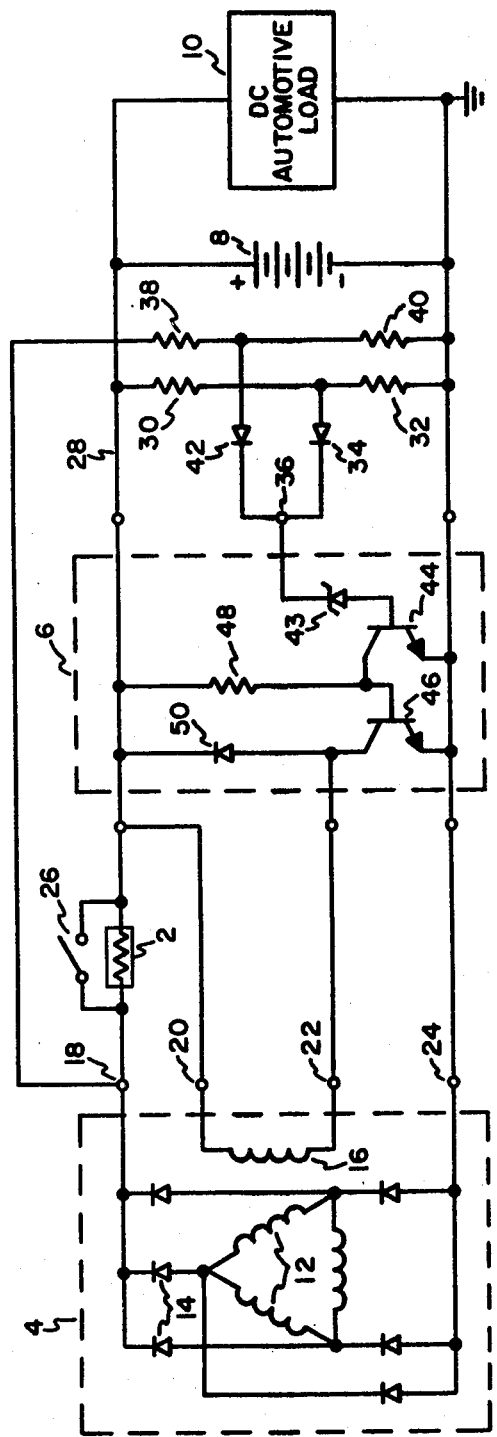
FIG. 1 is a schematic circuit diagram of an electrically heatable windshield heater control circuit, in accordance with a first embodiment of the invention.

Referring to FIG. 1 there is illustrated a schematic circuit diagram of a heater control circuit, in accordance with a first embodiment of the invention, for supplying power to a resistive heating element 2 such as may be embedded in the windshield, and also other windows including the backlite, of an automotive vehicle. The supplied power provides heat of sufficient quantity to deice the windshield. Included in the control circuit are standard automotive components such as a three phase alternator 4, schematically represented in simplified form, an automotive battery 8 and DC automotive load circuitry 10, such as may include the ignition system, lights, radio, blowers, etc., appearing in block form, which components are normally energized by the alternator 4. Also shown is voltage regulator means 6, which includes a portion of the circuitry of a standard automotive voltage regulator. With a minimum of components added to a standard automotive electrical system, the present circuit provides an operation whereby the alternator may furnish a relatively high power for windshield deicing and simultaneously supply the requisite current for charging the vehicle battery and for energizing the load circuitry.

For purposes of the present invention, the heating element 2 may take a number of different forms, being principally a means for developing heat in response to current conducted through it. By way of example, the resistive heating element may comprise a pattern of resistance wires embedded in an electrically heatable windshield, or other window, such as disclosed in U.S. Pat. No. 3,729,616, inventors G. A. Gruss et al, entitled "Electrically Heated Window", assigned to the present assignee.

The alternator 4 is a conventional circuit which is schematically represented in FIG. 1 to comprise delta configured stator windings 12 constructed integrally with a diode network including diode elements 14, a rotor field winding 16, an output terminal 18, a pair of field winding terminals 20, 22, and a circuit reference point or ground terminal 24. Current flowing in the field winding 16, which is rotatably mounted on the engine shaft, generates an AC voltage in the stator windings 12 that is proportional to the field current magnitude and shaft RPM. This AC voltage is rectified by the diode network to appear as a substantially DC voltage at an output voltage terminal 18 of alternator 4. In the present discussion, it may be appreciated that the term "alternator" is employed as applying to a standard automotive component for generating a DC voltage, such as the component 4 in FIG. 1.

Output terminal 18 is connected through series resistive heating element 2, which has a shorting switch 26 coupled in parallel with it, to a bus 28 which is connected to field winding terminal 20 for supplying field current to the winding. Bus 28 is also coupled to the voltage regulator 6, the positive, high voltage terminal of battery 8 and to the automotive load circuitry 10, which components are each referenced to ground. Bus 28 is further coupled to a first voltage divider network, including resistors 30 and 32 connected in series to ground. A diode 34 is coupled to the junction of the resistors for supplying a first control signal to the regulator 6 at input terminal 36. Correspondingly, output terminal 18 is further coupled to a second voltage divider network, including resistors 38 and 40 connected in series to ground, with a diode 42 coupled to their junction for supplying a second control signal to input terminal 36.

With switch 26 closed, the circuit operates in a conventional manner with the alternator serving solely to supply load current to the DC load 10 and charge current to the battery 8. The voltage output terminal 18 is controlled by regulator 6 to remain within a narrow band which corresponds to the voltage rating of the battery, typically approximately 14 volts. The regulator performs this function by controlling the magnitude of the field current in field winding 16. As the battery discharges and the alternator terminal voltage is reduced by an increased load, the regulator and alternator act to supply additional current to recharge the battery and also to satisfy the added load requirements.

Voltage regulator means 6 comprises a portion of a conventional voltage regulator circuit which is schematically represented in FIG. 1 to include a voltage reference diode 43 coupled to a first NPN transistor 44 which is coupled to a second NPN transistor 46 and a bias resistor 48, the output of transistor 46 being coupled to field winding terminal 22. Also included is a forward conducting diode 50 which is connected to the output of transistor 46 so as to be in shunt with field winding 16 to provide a free wheeling path for the field current. In general, when the voltage applied to input terminal 36 is less than the breakdown voltage of the reference diode 43, transistor 44 is nonconducting and transistor 46 conducts field current through the field winding for generating a voltage at output terminal 18 proportional to field current average magnitude and shaft RPM. The field current is equal to the effective average voltage across the field winding divided by the resistance of the field winding. When the voltage at input terminal 36 exceeds the reference diode breakdown voltage so as to cause transistor 44 to conduct and transistor 46 to be nonconducting, the field current goes substantially to zero and for this time essentially no output voltage is generated. The alternator diode network prevents discharge current flowing from the battery to the alternator. In actual operation, the conventional regulator system is constructed to exhibit a hystersis characteristic so that transistor 46 is controlled to conduct with a duty cycle that is a function of the difference between the voltage being sensed by the regulator and the regulator reference voltage, thereby controlling the magnitude of field current. Diode 50 is provided to accommodate the transient field current when transistor 46 is temporarily in the off state, since the field of the alternator is highly inductive and the field current cannot be changed abruptly. In a well known manner, the inductive time constant of the field current controls the timing of the duty cycle of transistor 46 and keeps the alternator output current waveform smooth.

As an alternative circuit connection common to many standard alternators, the field winding 16 can be coupled internally to the output terminal 18. Such connection allows greater range of control of the field current.

Consider now the operation of FIG. 1 in supplying power to the heating element 2 with the switch 26 open. In contrast to a normal operation of the circuit with the alternator supplying current to the load circuitry and battery and only the battery voltage level subject to regulation, the present circuit provides regulation of a second, substantially elevated voltage level at the alternator output terminal 18. The battery voltage level continues to be regulated in response to a first control signal supplied by the first voltage divider network of resistors 30 and 32 and diode 34. The elevated alternator voltage level is regulated in response to a second control signal supplied by the second voltage divider network of resistors 38 and 40 and diode 36.

It has been determined that 800 to 1000 watts are required to deice a windshield of average size in a period of less than five minutes. By increasing the alternator voltage at output terminal 18 to a level several times higher than the battery voltage, the requisite power can be supplied to the heating element with currents well within the current rating of a standard automotive alternator. In a typical heating operation, the output voltage is regulated to a level of about 40 volts, and the heating element resistance is on the order of one ohm. With approximately 14 volts maintained across the load 10, this provides an average current of about 30 to 40 amps.

Resistors 30 and 32 are high resistance components so as not to significantly load down the circuit. They are proportioned so that when the voltage between bus 28 and ground, or the battery voltage, exceeds a given level corresponding to the battery voltage rating, a divided voltage is provided at their junction which exceeds the breakdown voltage of reference diode 43, plus the forward voltage drops of diode 34 and the base-emitter junction of transistor 44, sufficiently to cause conduction of transistor 44. Transistor 46 then becomes nonconducting to reduce the field current to zero. This allows the voltage on bus 28 to decay and upon the junction voltage of resistors 30 and 32 falling below the level for causing breakdown of diode 43, transistor 44 stops conducting and transistor 46 conducts. This increases the field current to its rated value for once more raising the voltage on bus 28.

Resistors 38 and 40 are also high resistance components for minimum loading which are proportioned to provide a junction voltage that exceeds the breakdown voltage of diode 43, plus the forward voltage drops of diode 42 and the base-emitter junction of transistor 44, when the voltage between output terminal 18 and ground tends to rise above a predetermined level. This predetermined voltage level may be established in accordance with a desired operation, being normally selected as a voltage that will ensure adequate power applied to the resistive heating element 2 with currents well within the current rating of the alternator. Thus, when the alternator output voltage exceeds this predetermined level, transistor 44 is caused to conduct and transistor 46 to be nonconducting for reducing the field current to zero, the transient current being conducted through diode 50. Upon the output voltage falling below said predetermined level, transistor 46 once again is made to conduct rated field current.

The above is a simplified explanation of the regulator functioning that will suffice for an understanding of the present invention. It should be appreciated, however, that a standard automotive regulator system is well known to exhibit a hysteresis characteristic and have field winding inductance, as previously mentioned, which will cause transistor 46 to turn off at a slightly higher output voltage than it turns on so as to form a narrow band of voltages within which the transistor is operated in a duty cycle manner. Such hysteresis characteristic is known to be provided by a capacitive feedback connection such as between the output of transistor 46 and input terminal 36, not shown in the drawing.

Accordingly, the present circuit possesses the capability to provide power to the resistive heating element 2 while at the same time supplying current to the DC load and to the battery. Further, the circuit operation is under the control of first and second control means which supply first and second control signals to the regulator 6 for providing a dual regulation of the alternator output voltage. In a first instance, the output voltage is regulated as a function of the battery voltage so as to be operated within a first band of voltages which when translated through the resistive heating element to bus 28 corresponds to the rated battery voltage. In a second instance, the alternator output voltage is regulated as a direct function of itself so as to be operated within a second band of voltages corresponding to the aforestated predetermined voltage level.

The alternator output voltage normally falls under the control of either the first or second control means, depending upon which of the two junction voltages is the greater. Thus, for the condition in which there is a light to average automotive load, the voltage at the junction of resistors 30 and 32 will ordinarily be greater than the voltage at the junction of resistors 38 and 40, and the alternator output voltage comes under the control of the first control means responsive to the battery voltage. For the condition in which the load is great and may tend to be excessive, the voltage at the junction of resistors 38 and 40 will normally be the higher one and the output voltage falls under the control of the second control means responsive directly to the alternator output. This maintains the alternator output voltage within safe limits so as not to supply excessive heat to the resistive heating element nor to exceed the rated battery voltage.

Figure 2:
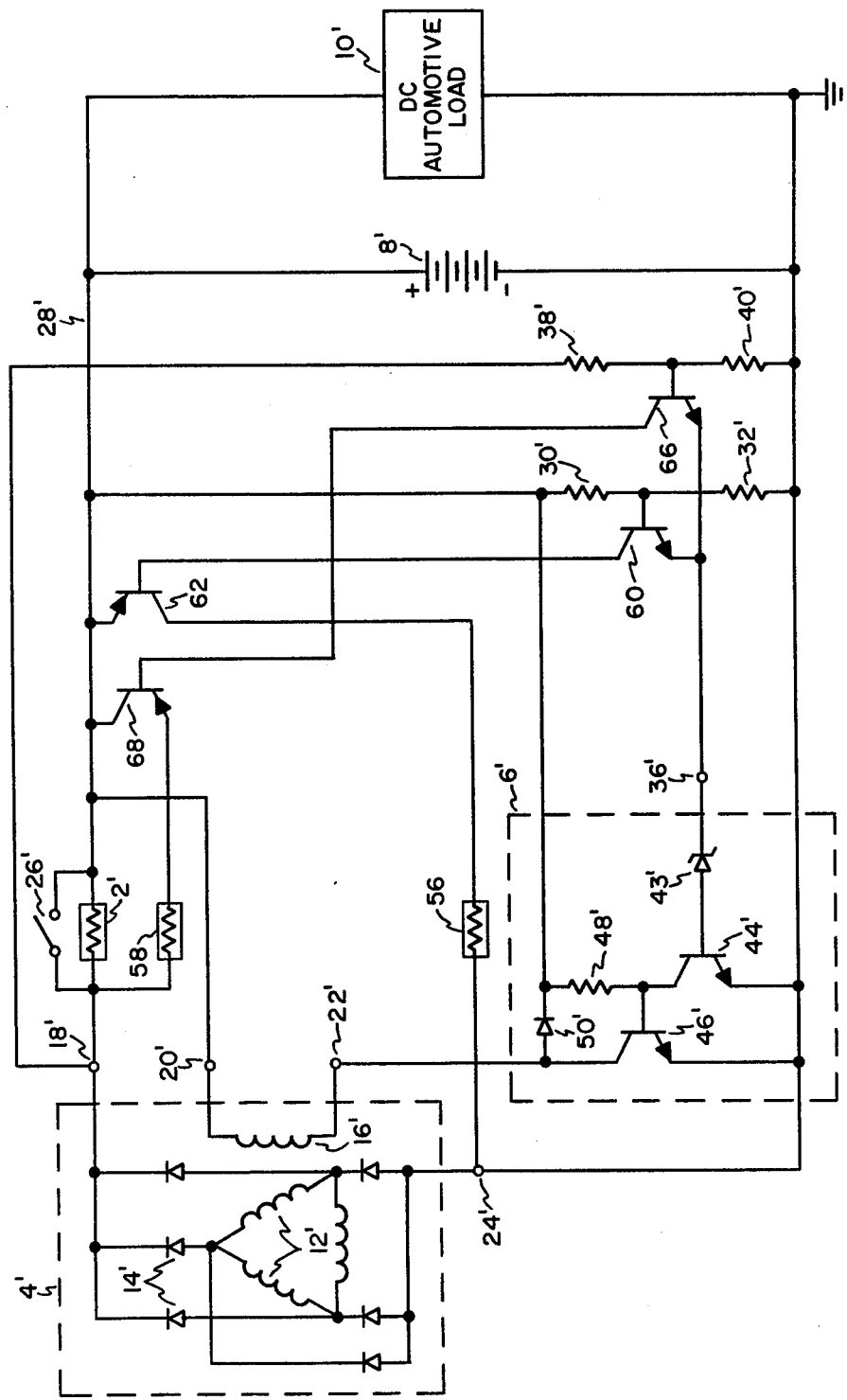
FIG. 2 is a schematic circuit diagram of an electrically heatable windshield heater control circuit, in accordance with a second embodiment of the invention.

With reference to FIG. 2 there is illustrated a second embodiment of a heater control circuit, in accordance with the invention. This circuit comprises additional resistive heating elements 56 and 58 and has for its purpose a more efficient distribution of power between the heating elements and the standard automotive electrical load, as well as to assist in achieving a dual voltage regulation. The additional heating elements can be employed to provide an additional deicing function or other auxilliary heating functions. A number of components in FIG. 2 will be seen to have corresponding counterparts in FIG. 1 and are identified by the same reference characters but with an added prime notation. They will not, therefore, be described in detail as respects FIG. 2. Accordingly, alternator 4' has its output terminal 18' connected through resistive heating element 2', paralled by switch 26', to but 28'. Bus 28' is again coupled to voltage regulator 6', battery 8', load 10' and to the first voltage divider network of resistors 30' and 32'. The second voltage divider network of resistors 38' and 40' is again coupled to output terminal 18'.

The junction of resistors 30' and 32' is connected to the base of a first NPN transistor 60 of the control means, whose emitter is connected to regulator input terminal 36' and whose collector is connected to the base of a first PNP transistor 62 of the control means. The emitter of transistor 62 is coupled to bus 28' and its collector is coupled through shunt resistive heating element 56 to ground. Thus, upon the voltage on bus 28' tending to exceed the rated battery voltage, the voltage at the junction of resistors 30' and 32' becomes great enough to make transistor 60 conduct and apply a first control signal to input terminal 36' that breaks down reference diode 43' to make transistor 44' conducting and transistor 46' nonconducting, as previously considered in respect to the operation of FIG. 1. Conduction of transistor 60 triggers transistor 62 into conduction for supplying power to the shunt heating element 56. Current through heating element 56, in addition to providing an auxiliary heating function, serves to as an added shunt load for more effectively bringing the voltage on bus 28' to within the battery rated level.

The junction of resistors 38' and 40' is connected to the base of a second NPN transistor 66 of the control means, whose emitter is connected to input terminal 36' and whose collector is connected to the base of a second PNP transistor 68 of the control means. The collector of transistor 68 is coupled to bus 28' and its emitter is coupled through a second series resistive heating element 58 to terminal 18'. In response to the output voltage at terminal 18' exceeding a predetermined level, the voltage at the junction of resistors 38' and 40' becomes great enough to make transistor 66 conduct and apply a second control signal to input terminal 36' that results in transistor 44' being conductive and transistor 46' being nonconductive. Conduction of transistor 66 triggers transistor 68 into conduction for supplying power to the added series heating element 58. Current conducted through heating element 58 serves to provide an auxiliary heating when there is excess output voltage available, and also assists in maintaining the output voltage within the referred to predetermined level.

Operation of the control circuit of FIG. 2, other than as regards the role of auxiliary resistive heating elements 56 and 58, is similar to that described in respect to FIG. 1 and need not be further considered. In FIG. 2, however, the transistor control devices 60 and 66 serve an additional function to that of supplying first and second control signals to the regulator input, namely that of coupling the auxiliary heating elements in and out of the circuit through the operation of added transistor control devices 62 and 68. Note that again hysteresis of the regulator means and inductance of the field keep the alternator output current smooth, and also that suitable time constants may be required in the operation of transistors 62 and 68 to ensure compatibility with any particular alternator field and regulator system.

While the invention has been described with reference to specific embodiments, the following claims are intended to include within their meaning all modifications and alternatives of the circuit that fall within the true scope and spirit of the invention.

What I claim as new and desire to secure as Letters Patent of the United States is:

1. A heater control circuit for automotive vehicles which have an electric alternator for supplying current to the vehicle battery and load circuit and a voltage regulator means for regulating the alternator voltage at the output terminal of said alternator, said control circuit comprising:
   (a) series resistive heating means selectively coupled between said output terminal and the high voltage terminal of said battery,
   (b) first control means responsive to the battery voltage at said high voltage terminal for supplying a first control signal to said voltage regulator means for regulating said alternator voltage within a first narrow band which when translated through said resistive heating means corresponds to a given voltage rating for said battery, and
   (c) second control means responsive to said alternator voltage for supplying a second control signal to said voltage regulator means for regulating said alternator voltage within a second narrow band which corresponds to a given power rating for said resistive heating means, whereby with said series resistive heating means connected in the circuit said heating means and said battery can be simultaneously energized under the control of a dual voltage regulation.

2. A heater control circuit as in claim 1 wherein said series resistive heating means includes a first series resistive heating element coupled in parallel with a first switching device which in its inoperative state serves to connect said series heating element into said circuit and in its operative state serves to short out said heating element.

3. A heater control circuit as in claim 2 further comprising shunt resistive heating means selectively coupled between said high voltage terminal and a circuit reference point.

4. A heater control circuit as in claim 3 wherein said shunt resistive heating means includes a shunt resistive heating element coupled in series with a second switching device which in its operative state serves to connect said shunt heating element into said circuit and in its inoperative state serves to disconnect said shunt heating element from said circuit.

5. A heater control as in claim 2 wherein said first and second control means are constructed so as to be responsive to different voltage levels whereby normally only one of said first and second control signals is supplied to said voltage regulator means at one time.

6. A heater control circuit as in claim 5 wherein said first control means includes a first voltage divider network coupled between said high voltage terminal and a circuit reference point, with a tap on said voltage divider network coupled through a first unidirectional conducting device to an input terminal of said voltage regulator means, and said second control means includes a second voltage divider network coupled between said output terminal and said reference point with a tap on said second voltage divider network coupled through a second unidirectional conducting device to said input terminal.

7. A heater control circuit as in claim 6 wherein said first and second unidirectional conducting devices are each diodes.

8. A heater control circuit as in claim 4 wherein said first control means includes a first voltage divider network coupled between said high voltage terminal and a circuit reference point, with a tap on said voltage divider network coupled through a first unidirectional conducting device to an input terminal of said voltage regulator means, and said second control means includes a second voltage divider network coupled between said output terminal and said reference point with a tap on said second voltage divider network coupled through a second unidirectional conducting device to said input terminal.

9. A heater control circuit as in claim 8 wherein said first and second unidirectional conducting devices are each transistors.

10. A heater control circuit as in claim 9 wherein said second switching device is a transistor which is made operative in response to the operation of said first unidirectional conducting device.

11. A heater control circuit as in claim 10 wherein said series resistive heating means further includes a second series resistive heating element serially, connected with a third switching device in a path that is also coupled in parallel with said first series resistive heating element.

12. A heater control circuit as in claim 11 wherein each circuit is constructed so that said third switching device is made operative in response to the operation of said second unidirectional conducting device.

13. A control circuit for automotive vehicles which have an electric alternator for supplying current to the vehicle battery and load circuit and a voltage regulator means for regulating the alternator voltage at the output terminal of said alternator, said control circuit comprising:

(a) means coupled to said output terminal and to the high voltage terminal of said battery for selectively providing an alternator voltage at said output terminal that is elevated with respect to the battery voltage at said high voltage terminal, (b) first control means responsive to the battery voltage at said high voltage terminal for supplying a first control signal to said voltage regulator means for regulating said alternator voltage within a first narrow band which corresponds to a given voltage rating for said battery, and (c) second control means responsive to the elevated alternator voltage for supplying a second control signal to said voltage regulator means for regulating said alternator voltage within a second narrow band that is elevated with respect to said first narrow band, whereby said alternator is placed under the control of a dual voltage regulation.

14. A control as in claim 13 wherein said first and second control means are constructed so as to be responsive to different voltage levels whereby normally only one of said first and second control signals is supplied to said voltage regulator means at one time.

15. A control circuit as in claim 14 wherein said first control means includes a first voltage divider network coupled between said high voltage terminal and a circuit reference point, with a tap on said voltage divider network coupled through a first unidirectional conducting device to an input terminal of said voltage regulator means, and said second control means includes a second voltage divider network coupled between said output terminal and said reference point with a tap on said second voltage divider network coupled through a second unidirectional conducting device to said input terminal.

16. A control circuit as in claim 15 wherein said first and second unidirectional conducting devices are each diodes.

* * * * *